United States Patent Office 3,409,667
Patented Nov. 5, 1968

3,409,667
METHOD FOR SEPARATING MONOCHLOROCARBOXYLIC ACIDS FROM DICHLOROCARBOXYLIC ACIDS
Robert E. Anderson, Midland, Mich., assignor to The Dow Chemical Company, Midland, Mich., a corporation of Delaware
No Drawing. Filed Jan. 24, 1966, Ser. No. 522,370
7 Claims. (Cl. 260—539)

This invention concerns the separation of a dichlorocarboxylic acid having the formula $Cl_2R'CO_2H$, wherein R' is —CH— or —CHCH$_2$— from an analogous monochlorocarboxylic acid having the formula $ClR''CO_2H$, wherein R'' is —CH$_2$— or —CH$_2$CH$_2$— by sorption and elution from a weakly basic anion exchange resin in the presence of a separatory component such as sulfurous acid.

In the preparation of monochloroacetic acid and dichloroacetic acid, hereinafter MCAA and DCAA, respectively, and monochloropropionic acid and dichloropropionic acid, hereinafter MCPA and DCPA, respectively, there has been no simple and economical method for separating the MCAA and the MCPA from the corresponding DCAA and DCPA, respectively. Similar boiling points rule out distillative separations. Crystallization gives eutectic mixtures.

It has now been discovered that acids having the formula $Cl_2R'COOH$ can be separated simply and economically from their monochlorocarboxylic analogs, $ClR''COOH$, as defined above, by sorption on a weakly basic anion exchange resin in the presence of sulfurous acid or equivalent acid separatory aids. Thereafter, the sorbed chlorocarboxylic acid species are eluted by displacement in separate fractions or waves using a strong non-oxidizing mineral acid as a eluant. A separation of the sorbed species is obtained by adding sulfur dioxide or equivalent acid separatory aid to the mixed feed solution. The sulfurous acid formed appears in the effluent from the weak base anion exchange resin distributed principally between the major portion of the monochloro- and dichlorocarboxylic acid fractions since it has an affinity for such resin intermediate those of the monochloro- and dichlorocarboxylic acid. The product fractions are thereby separated by the separatory aid. Such proportion of sulfurous acid or other separatory aid as appears in each of the product streams is readily removed by distillation or crystallization.

In the process of this invention, the loading of the chlorocarboxylic acids far exceeds the normal operating capacity of the weak base resin used and actually approaches or even surpasses the theoretic capacity based on its total nitrogen. Thus, other sorptive forces than true ion exchange are involved. Such high loading contributes to the practicality of the process as a commercial method. The separation obtained at high loading is due to the use of sulfurous acid or equivalent separatory aid in the system.

By "weak base anion exchange resins" is meant those anion exchange resins which have —NR$_2$, —NRH and —NH$_2$ functionality, i.e., are in the base form. They are generally prepared by substituting such a functional group on a resinous polymer matrix, advantageously that of a crosslinked polystyrene or a polyphenolformaldehyde. The functional groups are derived from primary and secondary amines and mixtures thereof; and polyamines, including those having primary and secondary amino groups such as alkylene diamines and polyalkylene polyamines. The hydrocarbonyl portion of the amine may be aliphatic, aromatic, cycloaliphatic, araliphatic and alkaromatic. Such resins and their method of preparation are disclosed in U.S. Patents 2,356,151; 2,366,008; 2,591,573; and 2,597,439. Epichlorohydrin-ammonia and epichlorohydrin-amine anion exchange condensation polymers wherein amine has the significance previously given, are also useful in the process of this invention. Such condensation polymer anion exchange resins and their preparation are disclosed in U.S. Patents 2,469,683; 2,610,156; 3,005,786; 3,132,112; and 3,137,659. Such resins are used in particulate or bead form and in the water-swollen state. In operation a columnar form of the water-swollen particulate resin is used.

Sulfurous acid in concentrated form and advantageously added as sulfur dioxide up to saturation of the aqueous solution of chlorocarboxylic acids to be separated, preferably under pressure, is the most advantageous separatory aid in that it has the proper acid strength, i.e., an ionization constant, or first ionization constant, intermediate those of the chlorocarboxylic acids to be separated. It can readily be separated from product streams by distillation and is relatively inexpensive. Other equivalent separatory aids can advantageously be used, in amounts up to saturation, i.e., if they have an ionization constant (affinity) for the weakly basic resins between those of the chlorocarboxylic acids to be separated, e.g., o-nitrobenzoic acid, 2-methyl-6-nitrobenzoic acid, and phosphoric acid.

Any strong non-oxidizing mineral acid, e.g., sulfuric, phosphoric or hydrochloric acid, can be used to elute the sorbed chlorocarboxylic acids. Hydrochloric acid is preferred in that it is chemically inert to the system, and can be removed from the chlorocarboxylic acid products by distillation.

In practice, there is added to an aqueous solution of monochloro- and dichlorocarboxylic acids concentrated sulfurous acid, preferably as sulfur dioxide up to saturation of said solution. Alternatively, there can be added another acid having an ionization constant or first ionization constant intermediate those of the two chlorocarboxylic acids to be separated. Such resulting solution is then fed to a column of water-swollen particulate ion exchange resin in the base form, advantageously to maximum sorption as measured by appearance of chlorocarboxylic acid in the column effluent. After the resin column is loaded, the two chlorocarboxylic acids and the acid separatory aid are displaced with mineral acid. Hydrochloric acid is the preferred mineral acid. The mineral acid elution is followed by a water rinse. The resin is thereafter regenerated with aqueous strong base, such as an alkali metal, an alkaline earth metal or a quaternary ammonium hydroxide, or a corresponding carbonate, bicarbonate or phosphate, which is water-soluble, and thereafter rinsed with water, advantageously deionized (DI) or distilled water to neutrality of the effluent.

The following examples describe completely representative specific embodiments and the best mode contemplated by the inventor for carrying out the invention. They are not to be considered as limiting the inventive process other than as claimed.

EXAMPLE I

A quantity of 100 ml. of water-swollen 50–100 U.S. mesh Dowex 3 resin beads in the base form (polymeric styrene crosslinked with 4 mol percent divinylbenzene, chloromethylated and then condensed with diethylenetriamine, having substituent —NHCH$_2$CH$_2$NH$_2$ functionality) was placed in a ½ in. ID x ⅛ in. thick x 36 in. long piece of gum rubber tubing contained in a corresponding length of loose fitting glass tubing. The resin was exhausted with N hydrochloric acid. The acid breakthrough occurred at a volume of 340 ml., indicating an operating capacity of ca. 3 me./ml. resin. The column was regenerated with N sodium hydroxide until free of chloride, rinsed with DI water until neutrality of effluent and backwashed.

A quantity of 250 ml. mixed acid feed having an analysis of 0.48 N MCAA
0.50 N DCAA
0.32 N sulfurous acid prepared by saturating a mixture of 0.50 N MCAA and 0.52 N DCAA with sulfur dioxide at atmospheric pressure was fed to the column, and after loading was rinsed with 400 ml. N hydrochloric acid and then with DI water. The average flow rate during the run was ca. 0.45 gal./min./ft.$^2$. The effluent was collected in bulk until an acid breakthrough occurred sharply at 383 ml. Nine successive 50 ml. samples of eluant were thereafter collected and analyzed with the following tabulated results.

TABLE I

| Vol. of Effluent, ml. | Normality | | | |
|---|---|---|---|---|
| | MCAA | H$_2$SO$_3$ | DCAA | HCl |
| 50 | .655 | .005 | .0 | .0 |
| 100 | 1.285 | .029 | .0 | .0 |
| 150 | .533 | .677 | .06 | .002 |
| 200 | .096 | .195 | .927 | .117 |
| 250 | .0 | .012 | .757 | .557 |
| 300 | .0 | .012 | .312 | .863 |
| 350 | .0 | .0 | .12 | .640 |
| 400 | .0 | .0 | .028 | .22 |
| 450 | .0 | .0 | .016 | .14 |

The single cycle run showed a very good separation. Multiple cycles and narrower effluent cuts are used to obtain product streams of desired purity.

Chloroacetic acid and dichloroacetic acid are too similar in acid strength to be differentiated by direct titration with base even in non-aqueous solvents. A satisfactory analytical method for these two acids plus hydrochloric and sulfurous acids, which were also present in the system, was set up using simple titrations.

(1) Total hydrogen ion concentration was determined by titrating a sample to pH 7 with N/10 caustic.

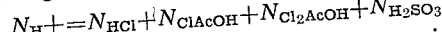

(2) Chloride ion concentration was determined by potentiometric titration with N/10 AgNO$_3$.

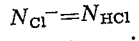

(3) Total chlorine was determined by potentiometric titration of a hydrolyzed sample with N/10 AgNO$_3$.

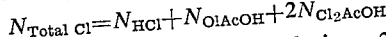

The hydrolysis was carried out by placing a 2 ml. sample, 10–15 ml. of water and half a dozen NaOH pellets in a small flask and heating at mild reflux. Chloroacetic acid was found to be completely hydrolyzed under these conditions after two hours, but dichloroacetic acid required considerably longer. All samples were run at least 8 hours and preferably overnight.

(4) One sample was titrated for hydrogen ion directly, and another after heating on a hot plate until there was no odor of SO$_2$. The difference in these two titrations was taken as an indication of the concentration of H$_2$SO$_3$ present.

EXAMPLE II

A commercial mixture of MCPA was diluted with water and SO$_2$ was bubbled through to saturation. The procedure of Example I was then repeated using the same procedure and the same column of resin after regeneration. The composition of the feed follows:

0.34 N MCPA
0.67 N DCPA
0.87 N H$_2$SO$_3$

A 200 ml. portion of the above solution was fed to the resin bed and followed with N hydrochloric acid. The affluent was collected in successive 50 ml. fractions and analyzed with the following results. Approximately 86% of the MCPA was recovered free of the DCAA and in an average concentration of about 4%. The rest of the MCPA was in the DCPA product. Approximately 87% of the DCPA was recovered as ca. a 5% solution containing ca. 0.3% MCPA. The rest of the DCPA was sorbed on the resin and could be eluted as an increasingly dilute, less than 1%, solution. Multiple cycles and narrower effluent fractions are used to obtain product streams of higher purity.

EXAMPLE III

Beds of 100 ml. of base form Dowex 4 resin, an epichlorohydrin-ammonia resin having a wet bed capacity of ca. 2 meq./ml. in strong acid; Duolite A30B resin, an epichlorohydrin-polyamine resin having a wet bed capacity of ca. 2.6 meq./ml. in strong acid; and Amberlite IR–4B resin, a polyphenolformaldehyde resin with polyamine functionality, having a wet bed capacity of 2.5 meq./ml. in strong acid, respectively; were each loaded with 150 ml. of a feed having the following composition:

.583 N MCAA
.583 N DCAA
.35 N H$_2$SO$_3$*

\* With IR–4B, H$_2$SO$_3$ normality, 0.27.

followed by elution with 400 ml. of N hydrochloric acid and then with DI water. The acid breakthroughs on the resins listed was 130 ml., 248 ml. and 377 ml., respectively. The flow rates varied from 0.4 to 0.7 gal./min./ft.$^2$ except for Amberlite IR–4B resin which almost stopped flowing just before the acid breakthrough. By adding more head to its column, the IR–4B resin flow rate was increased to 0.5 gal./min./ft.$^2$ before it decreased gradually down to 0.2 gal./min./ft.$^2$. The acid breakthrough in the effluent of these resins was the zero point for volume of effluent in the following Tables II, III and IV. The normality of each component was listed in the fraction where it appeared.

TABLE II.—SEPARATION OF CHLOROACETIC AND DICHLOROACETIC ACID ON DOWEX 4 RESIN BY ELUTING WITH N/1 HCl AND DI H$^2$O

| Fraction No. | Ml. in Fraction | Total ml. | Normality of Components | | | | Total Acid |
|---|---|---|---|---|---|---|---|
| | | | H$_2$SO$_3$ | MCAA | DCAA | HCl | |
| 1 | 50 | 50 | .0 | .09 | .0 | ----- | .09 |
| 2 | 50 | 100 | .025 | .51 | .04 | ----- | .575 |
| 3 | 57 | 157 | .03 | .52 | .16 | ----- | .71 |
| 4 | 53 | 210 | .075 | .165 | .34 | ----- | .58 |
| 5 | 50 | 260 | .20 | .135 | .46 | ----- | .805 |
| 6 | 50 | 310 | .265 | .095 | .46 | ----- | .82 |
| 7 | 60 | 370 | .335 | ----- | .135 | .44 | .91 |
| 8 | 55 | 425 | .02 | ----- | .02 | .94 | .98 |
| 9 | 50 | 475 | ----- | ----- | ----- | .955 | .955 |
| 10 | 50 | 525 | ----- | ----- | ----- | .955 | .955 |
| 11 | 50 | 575 | ----- | ----- | ----- | .545 | .545 |
| 12 | 50 | 625 | ----- | ----- | ----- | .245 | .245 |
| 13 | 50 | 675 | ----- | ----- | ----- | .15 | .15 |
| 14 | 50 | 725 | ----- | ----- | ----- | .105 | .105 |
| 15 | 75 | 800 | ----- | ----- | ----- | .08 | .08 |
| 16 | 370 | 1,170 | ----- | ----- | ----- | .05 | .05 |

H$_2$SO$_3$ recovery, 97.8%.
MCAA recovery, 91.4%.
DCAA recovery, 98.5%.

TABLE III.—SEPARATION OF CHLORACETIC AND DICHLOROACETIC ACID ON DUOLITE A30B BY ELUTING WITH N/1 HCl AND DI H$_2$O

| Fraction No. | Ml. in Fraction | Total ml. | Normality of Components | | | | Total Acid |
|---|---|---|---|---|---|---|---|
| | | | H$_2$SO$_3$ | MCAA | DCAA | HCl | |
| 1 | 57 | 57 | .0 | .17 | ----- | ----- | .17 |
| 2 | 50 | 107 | .04 | .45 | .03 | ----- | .52 |
| 3 | 50 | 157 | .13 | .495 | .135 | ----- | .765 |
| 4 | 50 | 207 | .29 | .265 | .43 | ----- | .985 |
| 5 | 50 | 257 | .275 | .16 | .59 | .025 | 1.05 |
| 6 | 50 | 307 | .20 | .06 | .445 | .38 | 1.085 |
| 7 | 50 | 357 | .045 | .055 | .11 | .845 | 1.055 |
| 8 | 50 | 407 | .02 | .04 | .02 | .83 | .915 |
| 9 | 50 | 457 | .005 | ----- | .015 | .345 | .365 |
| 10 | 50 | 507 | ----- | ----- | ----- | .19 | .195 |
| 11 | 50 | 557 | ----- | ----- | ----- | .13 | .135 |
| 12 | 50 | 607 | ----- | ----- | ----- | .105 | .105 |
| 13 | 50 | 657 | ----- | ----- | ----- | .085 | .085 |
| 14 | 400 | 1,057 | ----- | ----- | ----- | .0475 | .048 |

H$_2$SO$_3$ recovery, 95.7%.
MCAA recovery, 96.9%.
DCAA recovery, 103%.

TABLE IV.—SEPARATION OF CHLOROACETIC AND DICHLOROACETIC ACID ON AMBERLITE IR-4B RESIN BY ELUTING WITH N/1 HCl*

| Fraction No. | Ml. in Fraction | Total ml. | Normality of Components | | | | Total Acid |
|---|---|---|---|---|---|---|---|
| | | | $H_2SO_3$ | MCAA | DCAA | HCl | |
| 1 | 50 | 50 | .03 | 1.09 | | | 1.12 |
| 2 | 50 | 100 | .19 | .64 | | | 1.46 |
| 3 | 50 | 150 | .14 | | .57 | .055 | 1.49 |
| 4 | 50 | 200 | .1225 | | 1.025 | .32 | 1.0975 |
| 5 | 50 | 250 | .03 | | .135 | .84 | 1.005 |
| 6 | 50 | 300 | .02 | | | .91 | 1.01 |
| 7 | 50 | 350 | .02 | | | .915 | 1.005 |
| 8 | 100 | 450 | .02 | | | .92 | 1.04 |
| 9 | 50 | 500 | .025 | | | .92 | 1.015 |
| 10 | 55 | 555 | .0125 | | | .925 | 1.018 |
| 11 | 50 | 605 | .0075 | | | .95 | 1.022 |
| 12 | 100 | 705 | .03 | | | .97 | 1.02 |
| | | | | | | .975 | |

*No DI water was used after 400 ml. of N/1 HCl as in the previous runs because it was thought that it would swell the resin and stop the flow altogether.
$H_2SO_3$ recovery, 66.5%.
MCAA recovery, 98.9%.
DCAA recovery, 98.9%.

The substitution in each of Examples I–III of another acid as a separatory aid in place of sulfurous acid, which acid separatory aid has an ionization constant or a first ionization constant intermediate those of the chlorocarboxylic acids bieng separated, such as phosphoric acid, o-nitrobenzoic acid and 2-methyl-6-nitrobenzoic acid, gives similar advantageous results. It is not critical that the aqueous solution of chlorocarboxylic acids be saturated with the acid separatory aid. It is, however, preferred that the aqueous solution of chlorocarboxylic acids to be separated be saturated with the acid separatory aid, since better separations of the product acids are then obtained. However, any amount of acid separatory aid less than saturation concentration is operable in affecting an improved separation of product chlorocarboxylic acids.

I claim:
1. A method of separating from aqueous solution a mixture of analogous monochloro- and dichlorocarboxylic acids having two to three carbon atoms which comprises
    (1) adding to said solution an acid separatory aid having an ionization constant or a first ionization constant intermediate those of the two chlorocarboxylic acids,
    (2) feeding said solution to a column of a weak base anion exchange resin which resin sorbs said chlorocarboxylic acids,
    (3) eluting said chlorocarboxylic acids with a strong mineral acid eluant in fractions, the earlier fractions of which are predominantly those of the monochlorocarboxylic acid and the later fractions of which are predominantly those of the dichlorocarboxylic acid and recovering product chlorocarboxylic acids therefrom.
2. Method of claim 1 wherein the process is repeated for a plurality of cycles to give product chlorocarboxylic acids of a predetermined purity.
3. The method of claim 1 wherein the mixture is that of monochloroacetic and dichloroacetic acid.
4. Method of claim 1 wherein the mixture is that of monochloropropionic and dichloropropionic acid.
5. Method of claim 1 wherein the solution is saturated with sulfurous acid by adding sulfur dioxide thereto.
6. A method for separating from aqueous solution a mixture of monochloro- and dichloroacetic acid which comprises
    (1) saturating said solution with sulfur dioxide,
    (2) feeding said solution to a column of a weak base anion exchange resin in the base form, which resin sorbs said chloroacetic acids,
    (3) eluting said chloroacetic acids in fractions with concentrated hydrochloric acid, the earlier eluate fractions of which are predominantly those of monochloroacetic acid and the later eluate fractions of which are predominantly those of dichloroacetic acid and recovering product monochloroacetic and dichloroacetic acids therefrom.
7. Method of claim 6 wherein the process is repeated for a plurality of cycles to give product chlorocarboxylic acids of predetermined purity.

References Cited

UNITED STATES PATENTS 3,272,737   9/1966   Hansen et al. _____ 260—539 XR

OTHER REFERENCES

Funasaka et al., Bunseki Kagaku, vol. 7, pp. 69–73 (1958).

LORRAINE A. WEINBERGER, *Primary Examiner.*

A. P. HALLUIN, *Assistant Examiner.*